United States Patent
Bratten

(10) Patent No.: US 7,357,872 B2
(45) Date of Patent: Apr. 15, 2008

(54) LIFT STATION AND METHOD

(76) Inventor: Jack R. Bratten, 4657 Twin Fawn La., Orchard Lake, MI (US) 48324

( * ) Notice: Subject to any disclaimer, the term of this patent is extended or adjusted under 35 U.S.C. 154(b) by 12 days.

(21) Appl. No.: 11/591,755

(22) Filed: Nov. 2, 2006

(65) Prior Publication Data

US 2007/0051674 A1  Mar. 8, 2007

Related U.S. Application Data

(60) Division of application No. 10/764,433, filed on Jan. 25, 2004, now Pat. No. 7,134,557, and a continuation-in-part of application No. 10/394,513, filed on Mar. 21, 2003, now Pat. No. 7,077,954, and a continuation-in-part of application No. 09/498,178, filed on Feb. 4, 2000, now Pat. No. 6,705,555.

(60) Provisional application No. 60/533,910, filed on Dec. 31, 2003.

(51) Int. Cl.
*F03B 3/12* (2006.01)
*F03B 7/00* (2006.01)
*B23Q 11/00* (2006.01)
*B01D 17/12* (2006.01)

(52) U.S. Cl. .......................... 210/803; 210/523; 210/528; 415/3.1; 416/197 A

(58) Field of Classification Search ................ 210/803, 210/523, 528; 415/3.1; 416/197 A
See application file for complete search history.

(56) References Cited

U.S. PATENT DOCUMENTS

| 4,681,508 | A | * | 7/1987 | Kim | .......................... | 415/116 |
| 6,705,555 | B1 | * | 3/2004 | Bratten | .................... | 241/101.2 |
| 7,077,954 | B2 | * | 7/2006 | Bratten | ....................... | 210/223 |
| 7,134,557 | B2 | * | 11/2006 | Bratten | ....................... | 210/523 |

* cited by examiner

*Primary Examiner*—David A Reifsnyder
(74) *Attorney, Agent, or Firm*—John R. Benefiel

(57) ABSTRACT

A lift station for raising the level of an open channel flow of liquid by sweeping blades mounted to a rotated wheel into the liquid flow after entering a housing to sweep the liquid up and back along a housing interior wall and over a weir edge located well above the level of the open channel flow stream. The flow stream is caused to descend as it enters the housing through a drop to increase the flow velocity to a degree sufficient to offset the impeding effect on upstream flow of the encounter of the flow with the rotating blades. Roller bearings are mounted to the inside of the housing to side walls to support the bladed wheel and are packed with a solid lubricant to insure a long service life despite being exposed to the liquid and debris entrained therein. A reverse rotation device positively prevents a backwards rotation of the wheel to prevent damage to the blades. The wheel is driven by a motor mounted in a housing tray affixed to one side wall driving a drive shaft penetrating the side wall. The housing tray collects any liquid leaking past the shaft and has a sloping bottom directing liquid back towards a drain hole in the housing side wall.

2 Claims, 5 Drawing Sheets

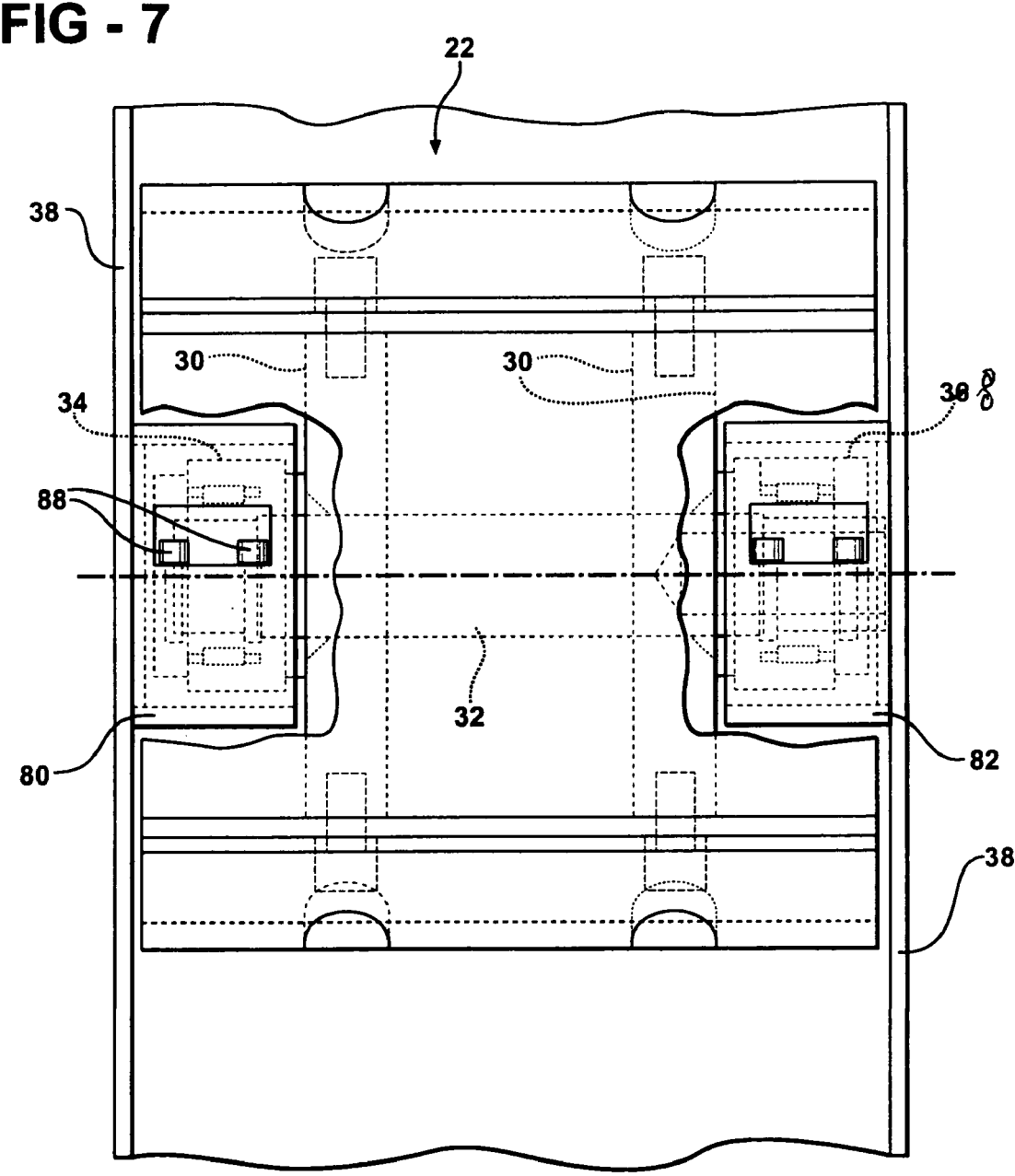

LIFT STATION AND METHOD

CROSS REFERENCE TO RELATED APPLICATIONS

This application is a divisional of U.S. Ser. No. 10/764,433 filed on Jan. 25, 2004, now U.S. Pat. No. 7,134,557, which claims the benefit of U.S. provisional Ser. No. 60/533,910, filed on Dec. 31, 2003, and which is a continuation-in-part of U.S. Ser. No. 10/394,513, filed Mar. 21, 2003, now U.S. Pat. No. 7,077,954 and also is a continuation-in-part of U.S. Ser. No. 09/498,178, filed Feb. 4, 2000, now U.S. Pat. No. 6,705,555.

BACKGROUND OF THE INVENTION

The present inventor has heretofore invented an apparatus and method for efficiently lifting liquid from a shallow depth open channel flow to a higher level, as described in EP 1 122 024 and the above cross referenced patents.

This apparatus comprises a rotating wheel having straight edged flexible blades which are rotated into the flow in the same direction as the flow, and sweep liquid up from the channel flow along an upwardly and rearwardly curved housing wall and over an elevated weir edge, to thereby be raised in level.

The object of the invention is to make certain improvements to improve performance of the apparatus referred to.

SUMMARY OF THE INVENTION

The improvements thereto include the addition of a steeply descending entryway into the housing creating an increased velocity of the liquid flowing in the channel immediately prior to encountering the wheel blades, this increase of a sufficient magnitude to prevent an interruption in the channel flow otherwise occurring when the flow first encounters the wheel blades, tending to create localized momentary slowings in the flow allowing debris to settle out to create a flow obstruction.

The housing is also provided with an upward flow guide partition leading to the weir edge which receives liquid slung from the blades and guides it up over the weir edge to maximize the proportion of liquid swept up by the blades which is passed over the weir edge.

An improved bearing structure for a wheel support shaft insures a long service life even though located within the housing and subjected to contact with the liquid and debris therein.

An antireverse arrangement mounted on the drive shaft connected to the wheel axle positively prevents inadvertent reverse rotation of the wheel which could otherwise damage or destroy the wheel blades.

The wheel blades are constructed of a double layer of thin sheet metal to be sufficiently flexible at their outer edges to deflect when encountering a large object in the liquid while being sufficiently stiff at their root to prevent excessive deflection when pushing liquid through the housing.

DESCRIPTION OF THE DRAWINGS

FIG. 7 is an elevational view of the bladed wheel and support shaft as well as a pair of shaft bearings mounted within the housing sidewalls shown in fragmentary form.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
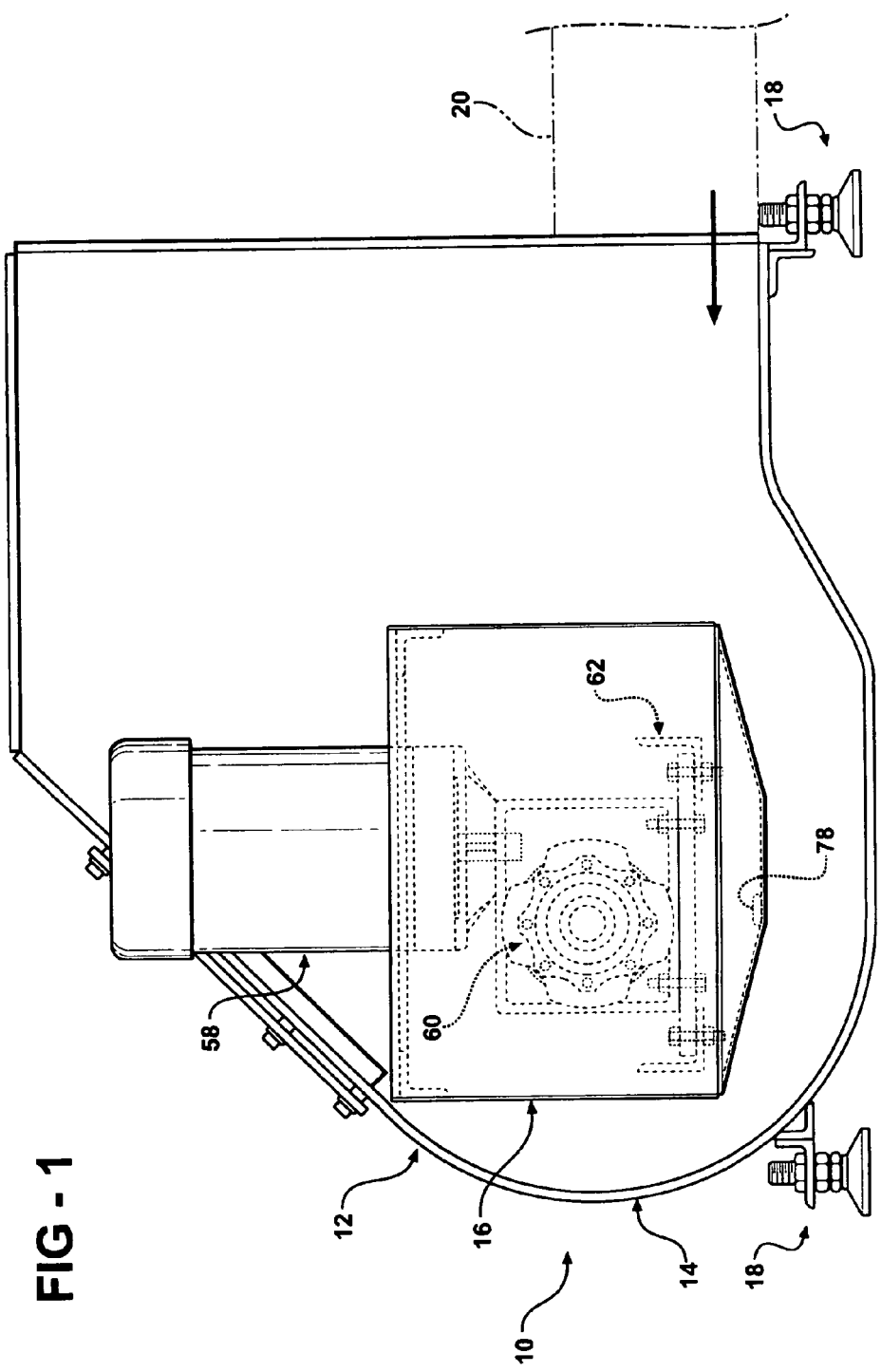
FIG. 1 is a side elevational view of an improved lift station apparatus according to the present invention, with a phantom line fragmenting depiction of a connected flow channel.

Referring to FIG. 1, the lift station 10 according to the present invention includes a housing 12 constructed of a weldment of steel plates, including a wheel housing 14 and a drive component tray-housing 16 disposed on one side of the wheel housing 14 at an intermediate height thereon. The housing 12 is supported on a series of leveling legs 18.

A trough or trench 20 carrying an open channel flow to be raised is aligned with an inlet end of the housing 12.

Figure 3:
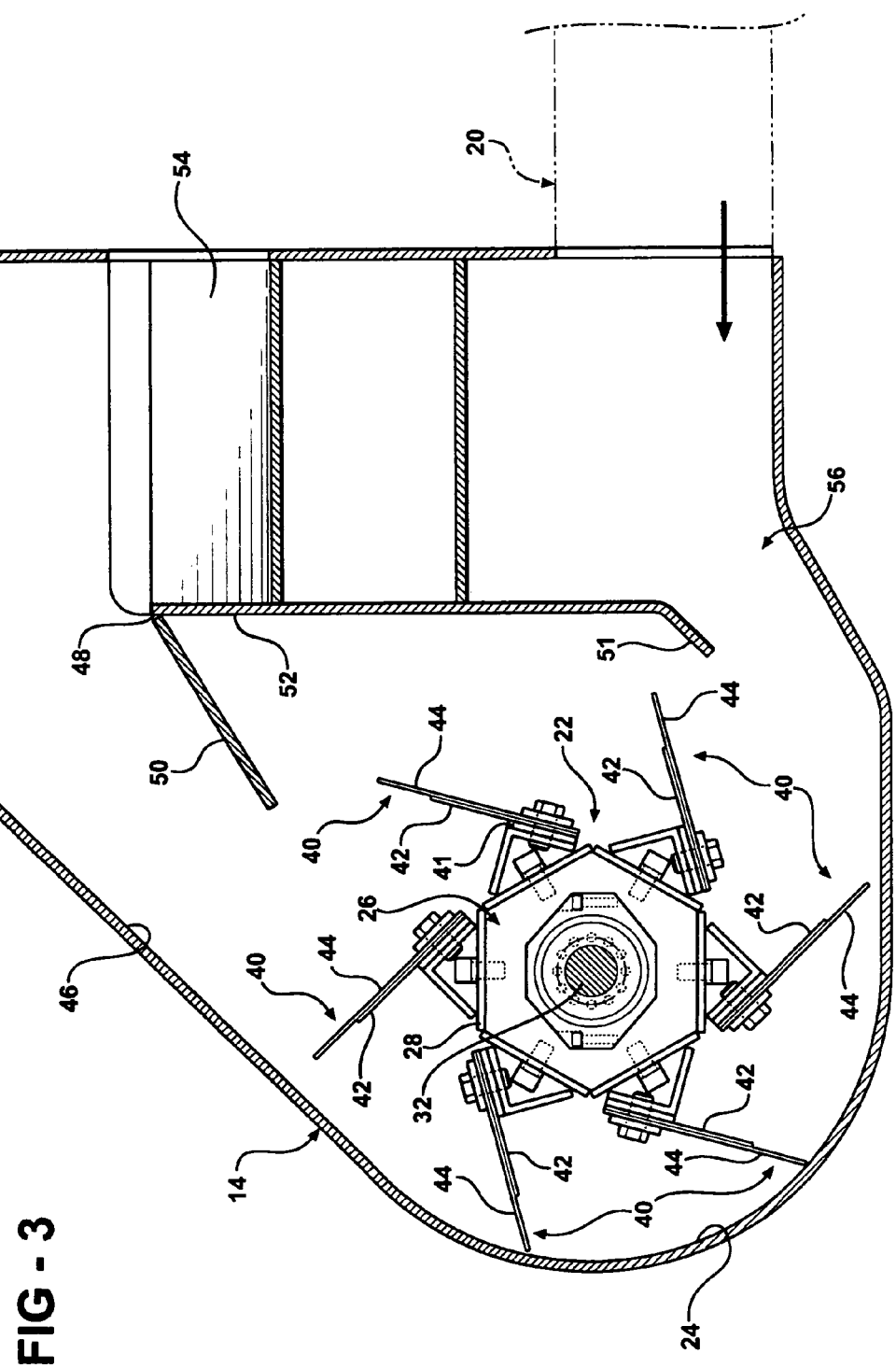
FIG. 3 is a partially sectional view showing details within the lift station housing.

A wheel assembly 22 is rotatable in the housing section 14, concentrically to a radiused rear wall segment 24 (FIG. 3).

The wheel assembly 22 comprises a hexagonal drum 26 formed by a series of plates 28 secured to hub pieces 30, welded to an axle shaft 32 supported on two bearings 34, 36 mounted to the inside of respective housing side plates 38 (FIG. 7).

A series of six longitudinal straight edged blades 40 are mounted about the perimeter of the drum 26 extending in a trailing direction relative the rotation of the wheel assembly 22 (clockwise as viewed in FIG. 3). The blades 40 are clamped against bars 41 fixed to angles 43 connected to plates 28.

The outer edges of the blades 40 sweep over the radiused rear wall 24 in close proximity thereto. The blades 40 are designed to have some flexibility to be able to deflect in the event a large object is encountered entrained in the liquid flow, while still being stiff enough to not deflect excessively under the load imposed by the weight of the liquid.

A suitable construction comprises two stacked thin sheets 42, 44 of "blue steel" (0.062 inches thick), a longer blade 44 projecting radially well past a shorter blade 42, such that stiffness is enhanced nearer the blade root to prevent excessive deflection which would affect the performance of the lift station.

A rearwardly inclined upper wall 46 of the housing guides the liquid swept up by the blades 40 and redirects the liquid backwardly towards a weir edge 48 defined at the top of a rear housing wall 52.

An upwardly inclined partition 50 receives liquid slung up and aids in directing the liquid passing off the wheel blades 40 up over the weir edge 48 to increase the proportion of liquid swept up by the blades 40 which will pass over the weir edge 48.

A bottom deflector 51 redirects any escaping liquid draining back down towards the wheel 22.

Figure 2:
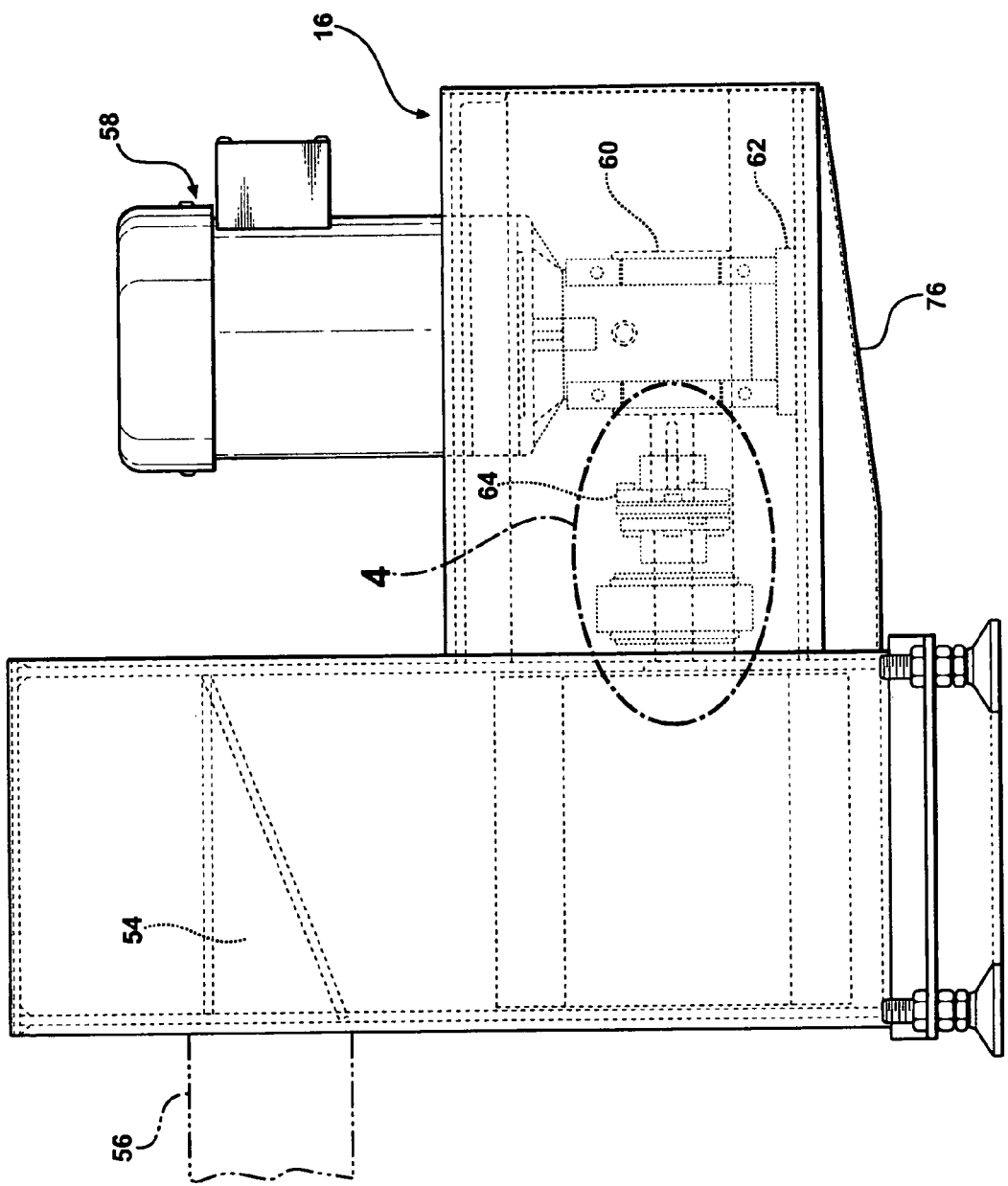
FIG. 2 is an end view of the apparatus shown in FIG. 1.

A downwardly inclined chute plate 54 on the other side of the weir edge 48 redirects the captured liquid to a receiving space 56 (shown in phantom lines in FIG. 2), such as a reservoir or the tank of a filtration apparatus as described in the above referenced patent applications.

The details of operation are set forth in allowed copending application Ser. No. 09/498,178, filed Feb. 4, 2000 and EP 1 122 024, which are here incorporated by reference.

According to one aspect of the present invention, a descending entryway 56 is provided just upstream from where the liquid open channel flow encounters the rotating wheel blades 40.

It has been found that this encounter can sometimes create disturbances in the entering open channel flow tending to create a back wave upstream, momentarily slowing flow in localized areas which results in machining debris settling out and create a blockage in the trench or chute along which the open channel flow moves. It has been discovered that by accelerating the flow rate at the point of entry by causing the channel liquid to plunge down the entryway 56, the retarding effect caused by encounter in the blades can be compensated for, and this described disturbance can thereby be avoided.

A drop of about three inches over the length of the entryway 56 has been determined to be sufficient to prevent any momentary slowing in the upstream open channel flow.

Figure 4:
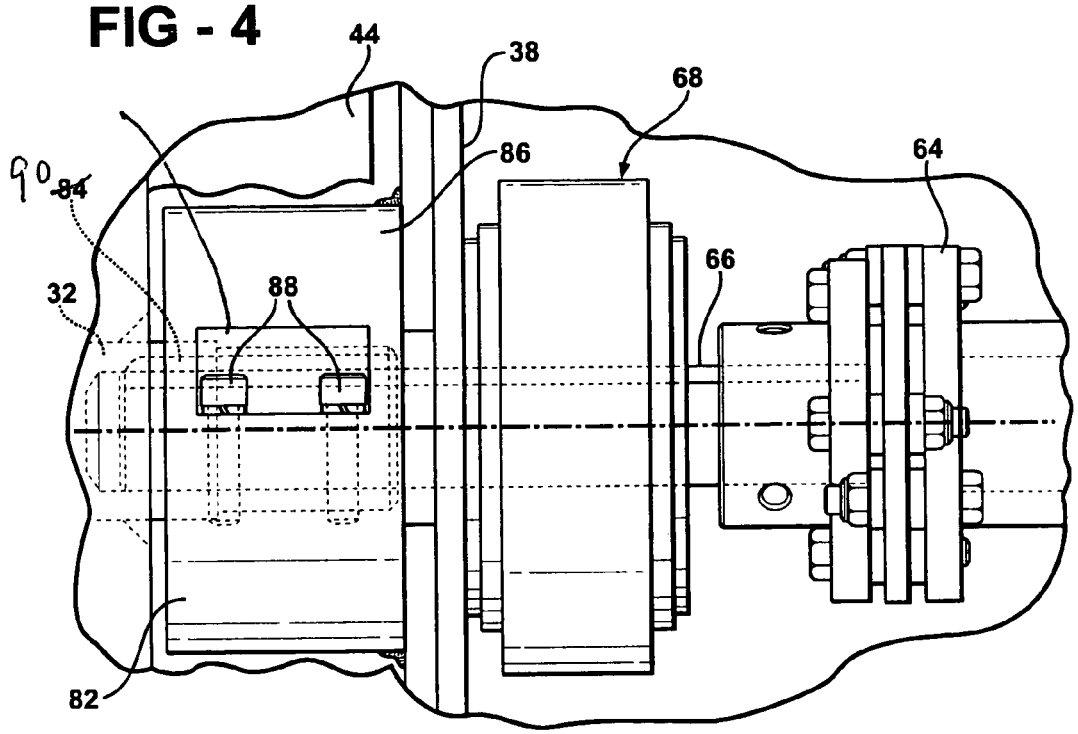
FIG. 4 is an enlarged fragmentary view of a portion of the apparatus as shown in FIG. 2.
Figure 5:
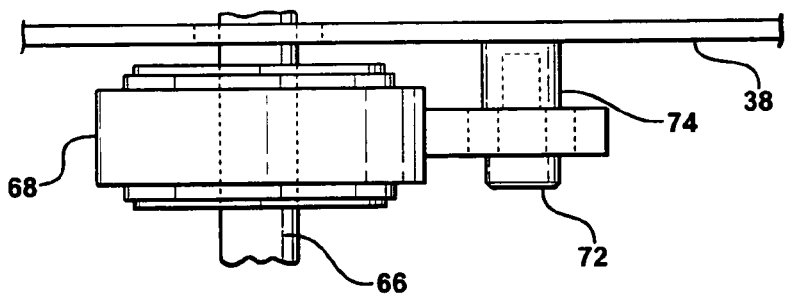
FIG. 5 is a top view of the components shown in FIG. 6.
Figure 6:
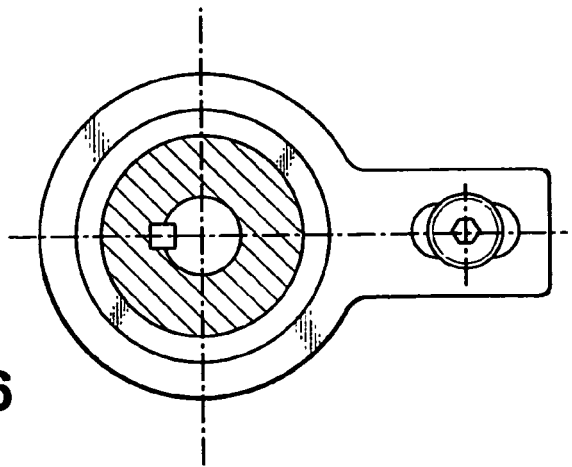
FIG. 6 is a view of the section 6-6 taken in FIG. 4.

The drive system for the bladed wheel 22 includes an electric drive motor 58 vertically mounted in a housing-tray 16 welded to one side of the housing, with a right angle gear reducer 60 and resting on a adjustable mounting 62 within the housing-tray 16 which allows alignment of a coupling 64 and drive unit output shaft 66 with the wheel axle shaft 32 (FIG. 4).

The drive unit output shaft 66 passes through an anti-reverse sprag clutch 68 which allows the shaft 66 to freely rotate in the proper direction but immediately locks if rotation in the reverse direction is attempted, as for example as a result of an inadvertent reverse wiring of the motor 58. A reaction arm 70 is connected to one of the side plates 38 by a machine screw 72 and a pedestal 74 welded to the side plate 38 to absorb the locking reaction force.

This prevents damage to the wheel blades 40 which would otherwise occur if reverse rotation occurred.

All of the drive components are contained in the housing-tray section 16, with the entry of the shaft 66 through the side wall 38 confined therein such that any leakage past the bearing 36 and shaft 66 is collected and redirected into the housing section 14 by the sloping bottom 76 of the housing-tray section 16 and a drain hole 78 at the bottom thereof.

The bearings 34 and 36 are mounted within a split bearing housings to avoid external leaks, each bearing housing comprised of a lower half 80, 82 welded to the inside of a respective housing side plate 38. A top cap 84, 86 is secured to a respective housing lower half 80, 82 by cap screws 88.

The drive unit output shaft 66 is received within and keyed to the wheel axle shaft at 90 as seen in FIG. 4.

The bearings 34, 36 are designed to resist the effects of being exposed to liquid and machining debris within the housing.

A McGill® Sphere Rol bearing is preferred, as having crowned rollers accommodating slight misalignments between each end of the shaft 32.

A solid lubricant commercially available from Phymet, Inc., of Springboro, Ohio under the trademark MICROPOLY® has been found to be effective in excluding liquid and debris to promote long bearing life.

The invention claimed is:

1. A method of raising the level of liquid in an open channel flow of liquid flowing down an inclined bottom collection trough extending beneath a machine tool installation to collect draining cutting fluid and entrained chips to form an open channel liquid flow stream within said collection trough, comprising the steps of:

guiding said open channel liquid stream in said collection trough into a housing having a bottom surface configured to receive said flowing liquid stream;

successively sweeping each of a plurality of blades into said flowing liquid stream to sweep liquid and chips along said housing bottom surface and up an upwardly curving wall surface into an exit chute extending back in a reverse direction from said flowing liquid stream, and over a weir edge located in said exit chute;

causing said open channel flow stream to plunge down into the region whereat blades sweep into said flow stream through a vertical drop sufficient to prevent a substantial disturbance in said open channel flow upstream from said region whereat said blades sweep into said flow.

2. The method according to claim 1 wherein said vertical drop comprises a distance approximately three inches to cause a sufficient increase in flow to prevent said upstream disturbance.

* * * * *